United States Patent [19]

Colton

[11] 4,435,737
[45] Mar. 6, 1984

[54] LOW COST CAPACITIVE ACCELEROMETER

[75] Inventor: Russell F. Colton, Cedar Rapids, Iowa

[73] Assignee: Rockwell International Corporation, El Segundo, Calif.

[21] Appl. No.: 331,416

[22] Filed: Dec. 16, 1981

[51] Int. Cl.³ .................... G01P 15/125; H01G 5/16
[52] U.S. Cl. .................... 361/280; 73/517 R
[58] Field of Search ............ 361/280, 283; 73/517 R, 73/517 B; 357/25, 26; 29/25.41; 310/329

[56] References Cited

U.S. PATENT DOCUMENTS

| | | | |
|---|---|---|---|
| 2,963,911 | 12/1960 | Courtney-Pratt et al. | 73/517 R |
| 4,023,413 | 5/1977 | Stauber | 73/517 B |
| 4,077,132 | 3/1978 | Erickson | 73/517 R |
| 4,257,274 | 3/1981 | Shimada et al. | 361/283 |
| 4,345,299 | 8/1982 | Ho | 361/283 |

Primary Examiner—B. A. Reynolds
Assistant Examiner—Alfred S. Keve
Attorney, Agent, or Firm—George A. Montanye; Howard R. Greenberg; H. Fredrick Hamann

[57] ABSTRACT

A capacitive transducer is disclosed which provides a measurement of acceleration. The transducer includes a semiconductor element having a mass ring suspended from an elastic diaphragm which is retained by a support. The mass ring is formed to have opposed parallel planar surfaces, each of which are spaced adjacent a metal layer deposited on a glass substrate to form a capacitive circuit. The metal layers are configured in the shape as the flat surface of the mass ring and are coupled to provide an electrical output. The semiconductor element forms a common capacitor plate disposed between the two capacitor plates formed by the metal layers. Movement of the mass ring in response to acceleration causes a change in the spacing between the mass ring and metal layers thereby changing the capacitance and providing a measure of acceleration.

12 Claims, 3 Drawing Figures

LOW COST CAPACITIVE ACCELEROMETER

BACKGROUND OF THE INVENTION

The present invention relates to semiconductor transducers and more particularly an accelerometer formed using semiconductor microcircuit technology.

In recent years there have been vast changes in aircraft avionics systems which require more sophisticated and highly accurate sensors for aircraft control. While electronic circuits have improved significantly, the mechanical structures required to convert such things as pressure, temperature and acceleration have become obsolete. As a result, increasingly sophisticated electronic systems are being used with relatively old mechanical devices for measuring physical parameters. Such a mismatch of technologies fails to take advantage of the many improvements in the electronic circuitry, thereby limiting the accuracy, sensitivity, and reliability of the systems.

In the area of accelerometers particularly, aircraft manufacturers and vendors of aircraft equipment have long relied on electromechanical sensing of acceleration. The conventional electromechanical devices generally include a moving vane and torque coil which is coupled to a sensing circuit and amplifier for registering acceleration changes upon movement of the torque coil. Such devices have long been used to provide a gross measurement of acceleration. However, the same devices suffer from various deficiencies which limit their use with sophisticated electronic systems.

One of the problems which has plagued the electromechanical structure is its susceptibility to aircraft vibration which decreases or destroys the accuracy of electromechanical sensing circuits. The vibration is particularly acute when the natural frequency of aircraft engines approaches the same frequency as the accelerometer. In modern aircraft, the natural frequency of the engines appears to be substantially the same as that of the electromechanical accelerometers. The resulting resonance therefore limits the accuracy and lifetime of the instrument.

Electromechanical accelerometers also suffer from calibration and temperature inaccuracies. It has been found that there is generally no standard for calibration of accelerometers. There is therefore an inability to provide an accurate correlation between the instruments, even when purchased from the same source. As a result, accelerometers are not interchangeable and cannot be accurately recalibrated. Vendors have further neglected to significantly improve the response of their sensors to varied temperature and external conditions. As a result, there is now a need to provide hermetically sealed instruments to reduce sensitivity and reliability problems, but the techniques for sealing have not been explored sufficiently to allow production of acceptable devices.

The use of the electromechanical accelerometers originated when aircraft operation was limited to relatively low altitudes. Accordingly, the temperature and other environmental conditions to which the accelerometers are now exposed at high altitudes prevents their reliable operation. In addition, the cumbersome and complex electromechanical structures are costly which limits their appeal for use in new avionics systems. There is therefore a need to provide highly reliable, low-cost transducers which can measure acceleration and be compatible with present electronic control systems.

Accordingly, the present invention has been developed to overcome the shortcomings of the above known and similar techniques and to provide a solid-state accelerometer capable of low-cost fabrication with microcircuit technology.

SUMMARY OF THE INVENTION

In accordance with the present invention, a capacitive accelerometer is constructed using microcircuit techniques to produce reliable, maintenance-free devices. The accelerometer includes a pair of glass plates having opposed parallel planar faces. The plates are spaced from one another and each has a metal layer of predetermined configuration deposited on one surface to form a capacitor plate. An acceleration sensing semiconductor element is positioned between the metal layers to form a common capacitor plate which moves in response to acceleration. The semiconductor element has an outer peripheral mass ring radially coupled through a flexible diaphragm to a center support portion which is attached to the opposed faces of the glass plate. The mass ring and metal layers are shaped in similar configurations so that two pairs of capacitor plates are formed. Movement of the mass ring in response to acceleration changes the spacing between the mass ring and the metal layers thereby causing a change in capacitance which is indicative of acceleration.

It is therefore a feature of the present invention to provide a semiconductor accelerometer which is simple and inexpensive in construction.

It is a further feature of the invention to provide a semiconductor accelerometer which includes a flexible silicon diaphragm supporting a mass ring between two capacitor plates.

It is still another feature of the present invention to provide a semiconductor accelerometer wherein the capacitors provide a measure of acceleration while compensating for temperature and stray capacitance.

A further feature of the invention is to provide a semiconductor accelerometer which may be hermetically sealed and constructed to prevent damage during high shock and high resonant conditions.

Yet another feature of the invention is to provide a semiconductor accelerometer wherein conventional etching and bonding techniques can be used to accurately fix the dimensions and spacing of the elements of the accelerometer.

These and other advantages and novel features of the invention will become apparent from the following detailed description when considered with the accompanying drawings wherein:

DETAILED DESCRIPTION OF A PREFERRED EMBODIMENT

Figure 1:
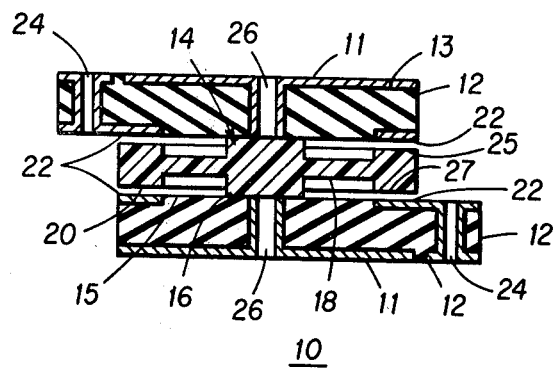
FIG. 1 is a side sectional view of the accelerometer transducer in accordance with the present invention.
Figure 2:
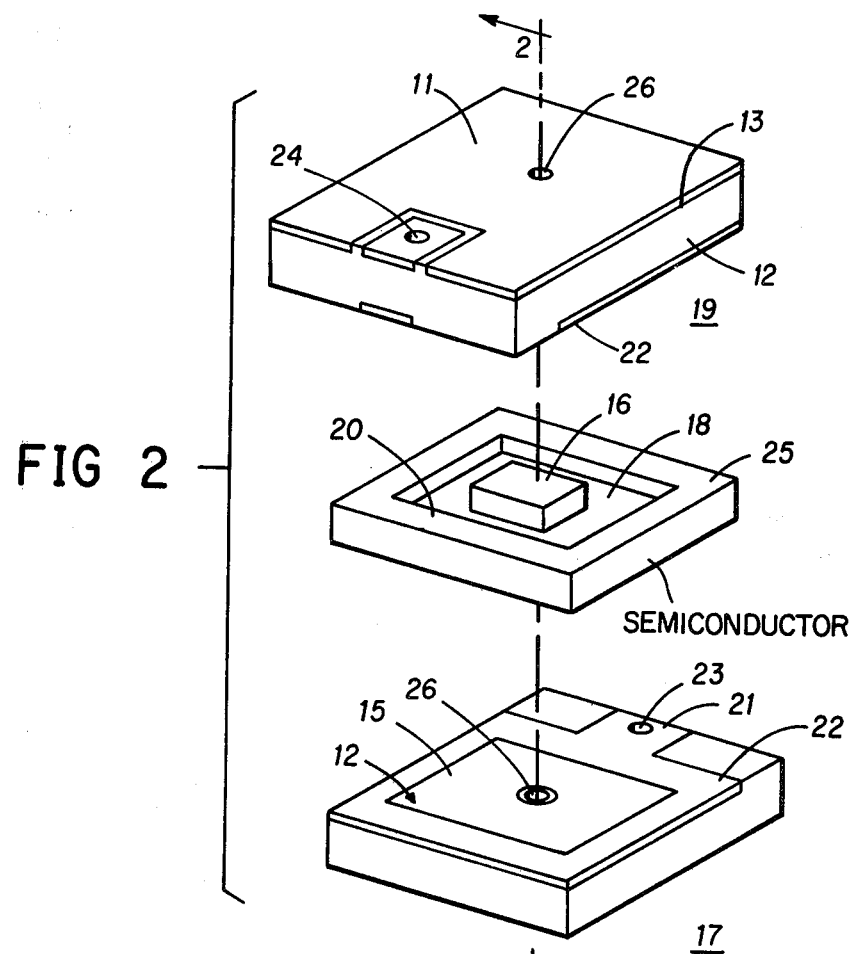
FIG. 2 is a perspective view of the three elements forming the structure of FIG. 1.

Details of the present accelerometer are shown in the drawings wherein like numerals are used to refer to like elements throughout. Referring first to FIG. 1, the accelerometer 10 is shown in side section taken along the line 2—2 in FIG. 2, and includes an upper and lower electrically insulating rectangular substrate 12 having opposed parallel planar surfaces 13 and 15. The upper and lower substrates 12 are plates of substantially identical configuration and the surfaces 13 and 15 are shown by elements 19 and 17 respectively in FIG. 2. Each substrate may be formed from a boro-silicate glass such as Pyrex and includes an electrically conductive layer 22 deposited in an annular rectangular configuration about the peripheral edge of surface 15. A projection 21 extends laterally as a portion of layer 22 to form an electrical coupling as will be subsequently described. The electrically conductive layer 22 may be deposited on the surface 15 of the substrate 12 or the substrate 12 may be etched or otherwise worked to form indentations within which the electrically conductive layer 22 is deposited. The deposition may be made using a metal such as gold applied with a conventional plating, sputtering or bonding process. The projection 21 includes an opening 24 extending from one side of the substrate 12 to the other. The opening includes an electrically conductive plating or coating which provides an electrically conductive path between the projection 21 and terminal pad 23 located on surface 13 of the substrate 12.

The other surface of substrate 12 may include an electrically conductive layer 11 which can be deposited in a manner similar to layer 22. Thus, the other surface of substrate 12 may be etched or otherwise worked to form indentations for receiving deposited layer 11, or the layer 11 may be deposited over the surface 13 of substrate 12 without etching or working. An opening 26 is formed between the opposed surfaces 13 and 15 and an electrically conductive coating is plated or deposited over the surface of the opening to form an electrically conductive path between the layer 11 and surface 15. The conductive coating for opening 26 may partially extend onto the surface 15 so that a terminal portion is formed which provides an electrical contact to the semiconductor element 14 as will be subsequently described.

The semiconductor element 14 forms the acceleration-responsive element of the transducer. The element 14 includes a center post portion 16 which is generally shown to be a rectangular member having opposed parallel planar surfaces which are attached to substrates 12 in the center of ring 22 to maintain the surfaces 15 of each substrate in opposed parallel relationship. A diaphragm portion 18, having an annular rectangular configuration, extends peripherally (circumferentially) from the post portion 16 and has a thickness which makes the portion 18 elastic, thereby allowing movement as will be subsequently described. A mass ring portion 20, having an annular rectangular configuration, peripherally extends from the diaphragm portion 18 and has opposed parallel planar faces 25 and 27 which are equally and symmetrically spaced from the respective opposed layers 22 on each of the substrates 12. The configuration of the mass ring portion is such as to produce surfaces 25 and 27 which are of identical shape and configuration as layers 22. Although layers 22 and mass ring 20 could be of other shapes, the construction of layers 22 in the same configuration as surfaces 25 and 27 optimizes capacitive sensitivity during transducer operation.

The semiconductor element 14 may be constructed using conventional microcircuit techniques by etching a semiconductive wafer such as silicon to provide the symmetrical arrangement of post portion 16, diaphragm portion 18, and mass ring portion 20. The silicon may be etched with conventional materials such as potassium hydroxide so that the rate of material removal may be easily controlled and thereby accurately fix the thickness and dimensions of each of the portions 16, 18 and 20. Many semiconductor elements 14 may be etched simultaneously from a single wafer thereby facilitating mass production and low cost. The substrates 12 may likewise be cut and worked from a single glass substrate and processed to deposit the electrically conducting metal layers using conventional deposition processes.

The semiconductor element 14 may be bonded to the glass surfaces by any technique capable of providing a high strength junction such as electrostatic or anodic bonding. During construction, the mass ring 20 is etched so that it has a mass sufficient to respond to acceleration and a thickness sufficient to provide a spacing between layers 22 so that there is capacitance for proper operation. It will be seen that the etching process can be used to accurately control the size and thickness of the mass ring 20 as well as the elastic diaphragm portion 18 so that proper sensitivity for different environments can be obtained.

Figure 3:
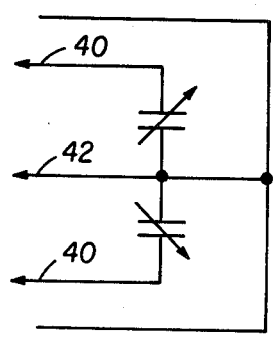
FIG. 3 is a schematic diagram of the electrical circuit formed by the transducer elements.

When assembled, the opposed surfaces 25 and 27 of the mass ring 20 are uniformly spaced from the conductive layers 22. As can be seen in FIG. 1, the substrates 12 are offset from one another to position the layers 22 in vertical alignment with one another and in vertical alignment with surfaces 25 and 27 of mass ring 20. Each of the conductive layers 22 forms a capacitor plate and mass ring 20 forms a common capacitor plate therebetween. Electrical terminal connections may be made to each of the metal coatings 22 by terminal pads 23 electrically coupled through plated holes 24 as previously described. Leads 40, as shown in FIG. 3, may be attached to each of the terminal pads 23 to provide the electrical connections to the capacitive circuit. A terminal coupled to an electrical lead 42 may be electrically coupled to the center post 16 by attachment to layer 11. The conductive coating which partially extends from opening 26 onto surface 15 may provide the electrical contact to post 16. Alternatively the coating of opening 26 may be electrically coupled to post 16 by conventional soldering techniques. The shielding layers 11 may likewise be electrically coupled to the plated holes 26 so that the layers 11 shield the capacitive plates 22 and 20 from electrical interference and stray capacitance.

In the present example, the substrates 12 may be formed as rectangles having side lengths of 0.550 in. (13.97 mm) and 0.500 in. (2.70 mm) respectively and a thickness of 0.040 in. (1.02mm). The thickness of the layers 22 and electrical shield 11 may be 1 $\mu$m. Semiconductor element 14 may have a square configuration wherein each outside side of the mass ring portion 20 measures 0.500 in. (12.70 mm) in length with the thickness being 0.020 in. (0.51 mm) and the width 0.085 in. (2.16 mm). The diaphragm portion may be controlled to have a thickness of 0.001 in. (0.0254 mm) with a width of 0.077 in. (1.956 mm). Finally, the center post portion may have a square configuration with a side length of 0.150 in. (3.81 mm) and a thickness of 0.021 in. (0.533 mm).

In operation, the accelerometer 10 is positioned in an aircraft frame where it is required to sense a particular acceleration. Leads 40 and 42 from the layers 22 and the semiconductor element 14 are coupled to electrical circuits capable of measuring the capacitance between the plates formed by layers 22 and the mass ring 20. When the structure is subjected to acceleration, the mass ring portion 20 will move due to the elasticity of the diaphragm 18 and cause a change of spacing between the surfaces 25 and 27 and the layers 22. The spacing change causes a change in the capacitance at the output leads 40 which is directly related to a measure of the acceleration. The output leads can thus be connected to an appropriate electrical circuit and used to display the acceleration or otherwise control the operation of an electronic or avionics system.

As can be seen by the above description, the accelerometer may be constructed with low-cost silicon and glass materials which facilitate multiple device construction using conventional manufacturing processes. The sandwich type construction allows the outside metal layers 22 to be maintained in close proximity to the moving mass ring portion so that damping is provided which limits Q values at resonance. The close sandwich structure prevents substantial travel of the mass ring portion 20 which would otherwise damage the transducer in high shock or resonant situations. An electrostatic or anodic bonding process or other equivalent process may be used to bond the semiconductor element to the glass substrates to produce high strength joints and precise positioning and spacing. By use of the two capacitor plates surrounding the semiconductor capacitor plate, temperature and stray capacitance can be cancelled in the output circuit. The use of plated holes to provide terminals for lead attachment also produces a device which can be easily hermetically sealed thereby minimizing exposure of the transducer to temperature and other detrimental environmental effects which may normally be encountered during aircraft use. These are all advantages and features that are unrecognized in the prior art.

While the invention has been described with reference to particular shapes and configurations, it is obvious that other shapes (e.g. circular) of the semiconductor element and conductive rings could be used without departing from the present teachings. Also while specific sizes and spacings are described, the same may be varied to achieve different sensitivity and ranges of operation. Obviously many other modifications and variations are possible in light of the above teachings. It is therefore to be understood that within the scope of the appended claims the invention may be practiced otherwise than as specifically described.

What is claimed is:

1. A semiconductor acceleration transducer comprising:
    at least one first substrate means having an electrically conductive portion for forming a first capacitor plate; and
    an acceleration-responsive semiconductor means coupled to said substrate means and spaced adjacent said electrically conductive portion for forming a second capacitor plate and being movable in response to acceleration to cause a change in capacitance between said first and second plates, said semiconductor means comprising a semiconductor element including a central post portion attached to said first substrate means, an elastic diaphragm portion circumferentially extending from said post portion and an acceleration-responsive mass ring portion circumferentially extending from said diaphragm portion.

2. The transducer of claim 1 further including a second substrate means having an electrically conductive portion forming a third capacitor plate, said second substrate means being coupled adjacent said semiconductor means to form a capacitive circuit wherein movement of said semiconductor means in response to acceleration causes a change in capacitance between said second and third capacitor plates.

3. A semiconductor acceleration transducer comprising:
    a first electrically insulating substrate having an electrically conductive surface forming a first capacitor plate;
    a second electrically insulating substrate having an electrically conductive surface forming a second capacitor plate, said first and second substrates being positioned adjacent one another to position their respective capacitor plates in opposed, spaced relationship; and
    an acceleration-responsive semiconductor element attached to and positioned between said first and second substrates and including a post portion attached to said first and second substrates, a flexible semiconductor diaphragm extending from said post portion and a mass ring portion extending from said diaphragm portion between said first and second substrates and positioned in spaced relation to said electrically conductive surfaces to form a common capacitor plate therebetween.

4. The transducer of claim 3 wherein said semiconductor element is formed as a unitary structure from a single semiconductor wafer.

5. The transducer of claim 3 further including a shielding means attached to said first and second substrate for shielding said capacitor plates from electrical interference and stray capacitance.

6. The transducer of claim 3 wherein said mass ring portion is responsive to acceleration and has opposed parallel planar surfaces which move in a direction substantially perpendicular to the conductive surfaces forming said first and second capacitor plates.

7. A semiconductor accelerometer transducer comprising:
    a first electrically insulating substrate having opposed parallel planar surfaces;
    an electrically conductive layer disposed on one of said surfaces of said first substrate forming a first capacitor plate;
    electrically conductive means attached to said first capacitor plate for forming an electrical terminal which provides an electrically conductive path to said first capacitor plate;
    an acceleration-responsive semiconductor element including a central mounting post portion having opposed parallel planar surfaces, one of which is centrally attached to said one surface of said first substrate, a flexible diaphragm portion extending about the periphery of said mounting post portion, and a mass ring portion having opposed parallel planar surfaces and extending about the periphery of said diaphragm portion, said mass ring portion being retained by said post portion and diaphragm portion so that one of the planar surfaces is spaced from the conductive layer forming said first capacitor plate;
    a second electrically insulating substrate having opposed parallel planar surfaces one of which is attached to the mounting post portion of said semiconductor element to position one of its surfaces in opposed parallel relation to the other surface of said mass ring portion;

an electrically conductive layer disposed on said one surface of said second substrate to form a second capacitor plate positioned in opposed spaced parallel relation to said other surface of said mass ring portion; and electrically conductive means attached to said second capacitor plate for forming an electrical terminal which provides an electrically conductive path to said second capacitor plate.

8. The transducer of claim 7 further including an electrically conductive member extending from said one surface of said first substrate to the other surface of said first substrate and electrically coupled to said post portion for forming an electrical terminal on the other surface of said first substrate.

9. The transducer of claim 7 wherein said mass ring portion is formed to have opposed surfaces that form generally rectangular bands extending about the periphery of the diaphragm and further wherein said conductive layers on said first and second substrates have the same configuration as the surface of the mass ring portion and are positioned in opposed parallel relation so that the mass ring portion is spaced between the first and second capacitor plates to form a common capacitor plate therebetween.

10. The transducer of claim 7 wherein said semiconductor element is etched from a single silicon wafer to form said post portion, diaphragm portion and mass ring portion, all of which are symmetrical with respect to said first and second substrates.

11. The transducer of claim 7 wherein each of said electrically conductive means comprises an opening between the opposed surfaces of each substrate, each of which is coated with an electrically conductive material electrically coupled on said one surface of each substrate to a projection extending from an electrically conductive layer and electrically coupled on said other surface of each substrate to an electrical terminal.

12. A semiconductor acceleration transducer comprising:

at least one first substrate means having an electrically conductive portion for forming a first capacitor plate; and an acceleration-responsive semiconductor means coupled to said substrate means and spaced adjacent said electrically conductive portion for forming a second capacitor plate and being movable in response to acceleration to cause a change in capacitance between said first and second plates, said semiconductor means comprising an integral structure formed from a semiconductor wafer including a central post portion attached to said first substrate means, an elastic diaphragm portion circumferentially extending from said post portion, and an acceleration-responsive mass ring portion circumferentially extending from said diaphragm portion.

* * * * *